(12) United States Patent
Bögelein et al.

(10) Patent No.: US 8,191,688 B2
(45) Date of Patent: Jun. 5, 2012

(54) INDUSTRIAL TRUCK WITH EXCHANGEABLE BATTERY BLOCK

(75) Inventors: Rolf Bögelein, Crailsheim (DE); Franz Hatzl, Hohenthann (DE); Oleg Plastinin, Landshut (DE); Ralf Werner, Landshut (DE); Christoph Zeidler, Landshut (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 1002 days.

(21) Appl. No.: 12/168,646

(22) Filed: Jul. 7, 2008

(65) Prior Publication Data

US 2009/0020368 A1 Jan. 22, 2009

(30) Foreign Application Priority Data

Jul. 5, 2007 (DE) .......................... 10 2007 031 149

(51) Int. Cl.
*B66F 9/075* (2006.01)
*B60R 16/04* (2006.01)
*B60S 5/06* (2006.01)

(52) U.S. Cl. ........ 187/222; 414/629; 414/631; 414/345; 414/396; 414/401; 180/68.5

(58) Field of Classification Search ............ 429/96–100; 180/68.5; 187/222; 414/629, 631, 345, 396, 414/401; *B66F 9/06, 9/075; B60R 16/04; B60S 5/06*
See application file for complete search history.

(56) References Cited

U.S. PATENT DOCUMENTS 3,259,365 A 7/1966 Gibson
3,989,118 A * 11/1976 Hansen .......................... 180/68.5
4,450,400 A * 5/1984 Gwyn ............................. 320/109
4,808,058 A * 2/1989 Carney et al. .................. 414/343
(Continued)

FOREIGN PATENT DOCUMENTS

DE 199 56 623 A1 6/2001
(Continued)

OTHER PUBLICATIONS

Search report for Serial No. 10 2007 031 149.6, German Patent Office, Mar. 18, 2008, pp. 1-4.

*Primary Examiner* — Michael Mansen
*Assistant Examiner* — Stefan Kruer
(74) *Attorney, Agent, or Firm* — Rothwell, Figg, Ernst & Manbeck, P.C.

(57) ABSTRACT

Industrial truck, in particular fork lift, having an exchangeable battery block (13) and a battery case (3) which accommodates the battery block (13), with the battery case (3) having a lateral access opening (7) to slide the battery block (13) with a first end first into the battery case (3) and pull the battery block (13) with its first end last out of the battery case (3), with the battery block (13) accommodated in the battery case (3) being supported near its first end with at least one independent roller (25) on the battery case bottom (5), characterized in that that on the battery block (13) accommodated in the battery case (3), a projection (21) at the first end opposite the second end of said battery block, which projects over a front edge section (29) of the battery case bottom (5) near the access opening (7) and over the underside of the battery case bottom (5) downward, is provided as lifting abutment for a battery transport device (33), in particular a fork lift device to lift the battery block (13) and pull said battery block out of the battery case (3).

13 Claims, 7 Drawing Sheets

U.S. PATENT DOCUMENTS

| | | | |
|---|---|---|---|
| 5,297,645 A * | 3/1994 | Eckersley et al. | 180/68.5 |
| 5,360,307 A * | 11/1994 | Schemm et al. | 414/343 |
| 5,452,983 A * | 9/1995 | Parmley, Sr. | 414/345 |
| 7,175,379 B2 * | 2/2007 | Sellhorn et al. | 414/607 |
| 7,249,645 B2 | 7/2007 | Herrmann et al. | |
| 2004/0157117 A1 * | 8/2004 | Tamaki et al. | 429/99 |
| 2008/0006459 A1 * | 1/2008 | Niebuhr | 180/68.5 |
| 2009/0288898 A1 * | 11/2009 | Boegelein et al. | 180/68.5 |
| 2011/0068309 A1 * | 3/2011 | Haslberger et al. | 254/2 R |

FOREIGN PATENT DOCUMENTS

| | | |
|---|---|---|
| DE | 103 42 659 A1 | 4/2005 |
| DE | 10 2005 016 277 A1 | 10/2006 |
| DE | 10 2005 022 094 A1 | 11/2006 |
| DE | 10 2005 025647 A1 | 12/2006 |
| DE | 10 2005 051 015 A1 | 4/2007 |
| DE | 10 2006 033526 A1 | 1/2008 |
| DE | 10 2006 050431 A1 | 4/2008 |
| DE | 10 2006 060325 A1 | 6/2008 |
| EP | 1095831 A2 * | 5/2001 |
| EP | 1 661 847 A1 | 5/2006 |
| EP | 1 925 588 A2 | 5/2008 |
| EP | 2123526 A2 * | 11/2009 |
| JP | 08165094 A * | 6/1996 |
| JP | 11139167 A * | 5/1999 |
| JP | 2002362263 A * | 12/2002 |
| JP | 2004262632 A * | 9/2004 |
| JP | 2005001819 A * | 1/2005 |
| JP | 2006096145 A * | 4/2006 |
| JP | 2006347665 A * | 12/2006 |

* cited by examiner

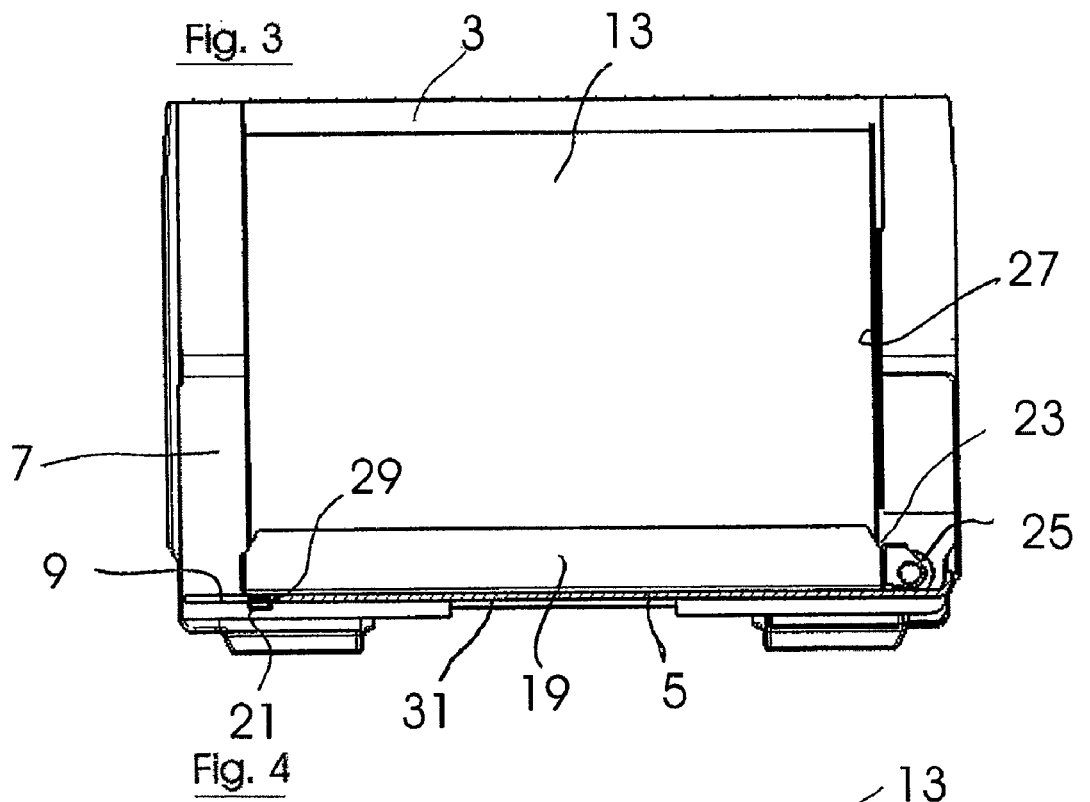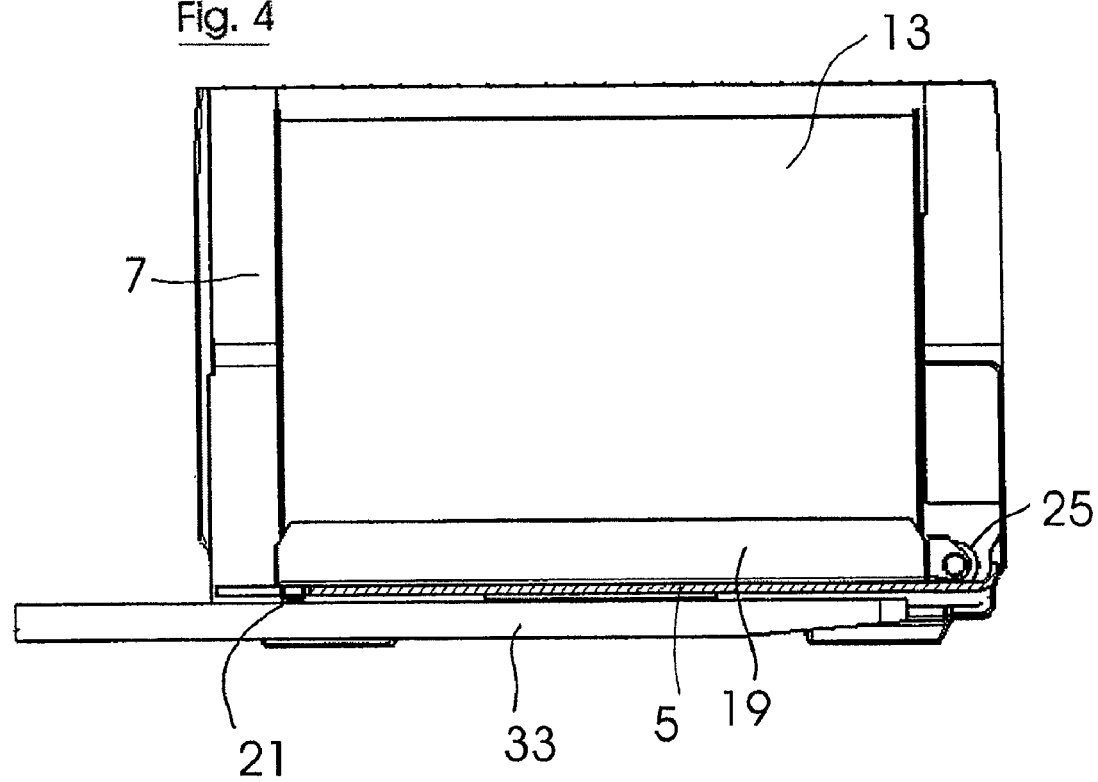

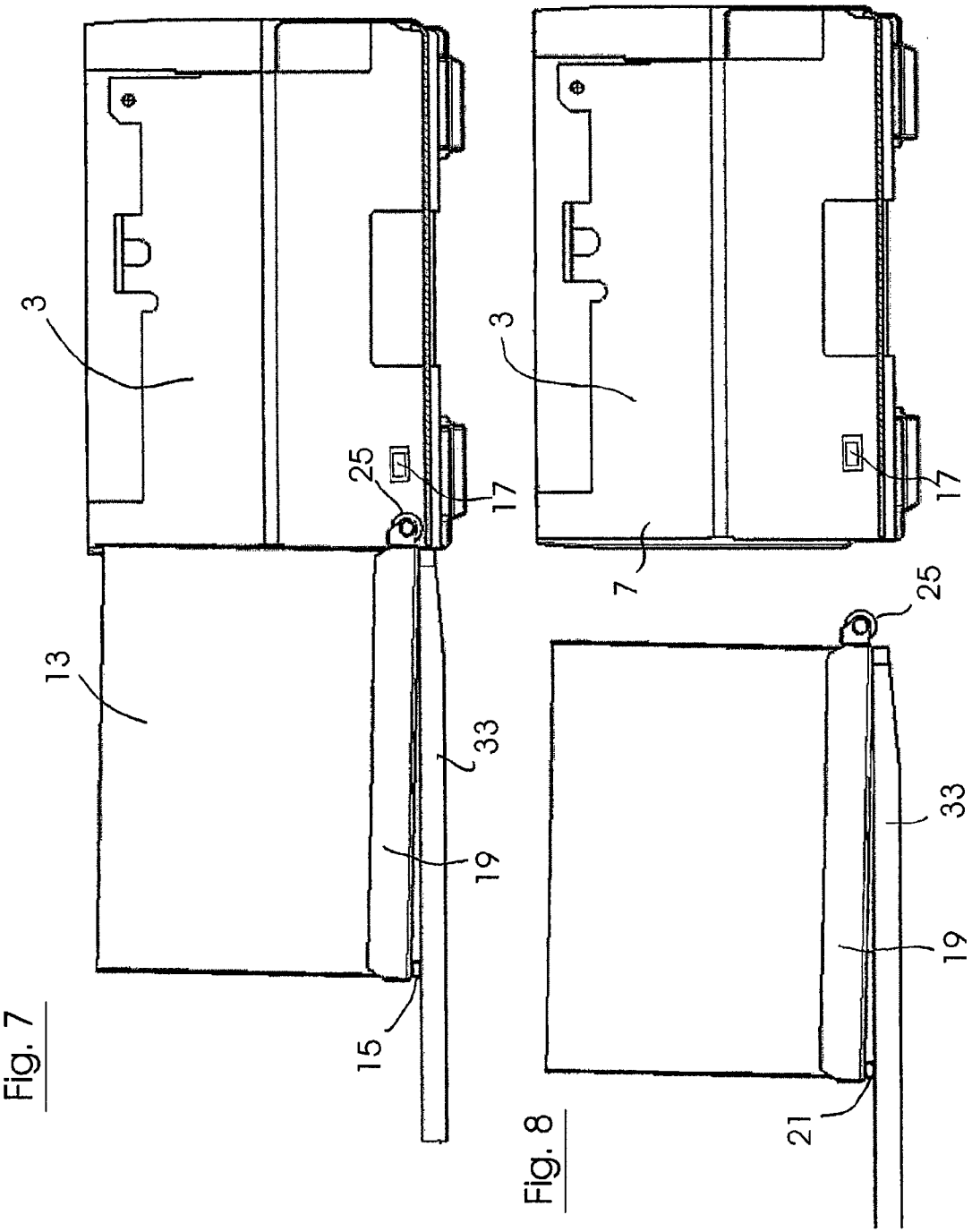

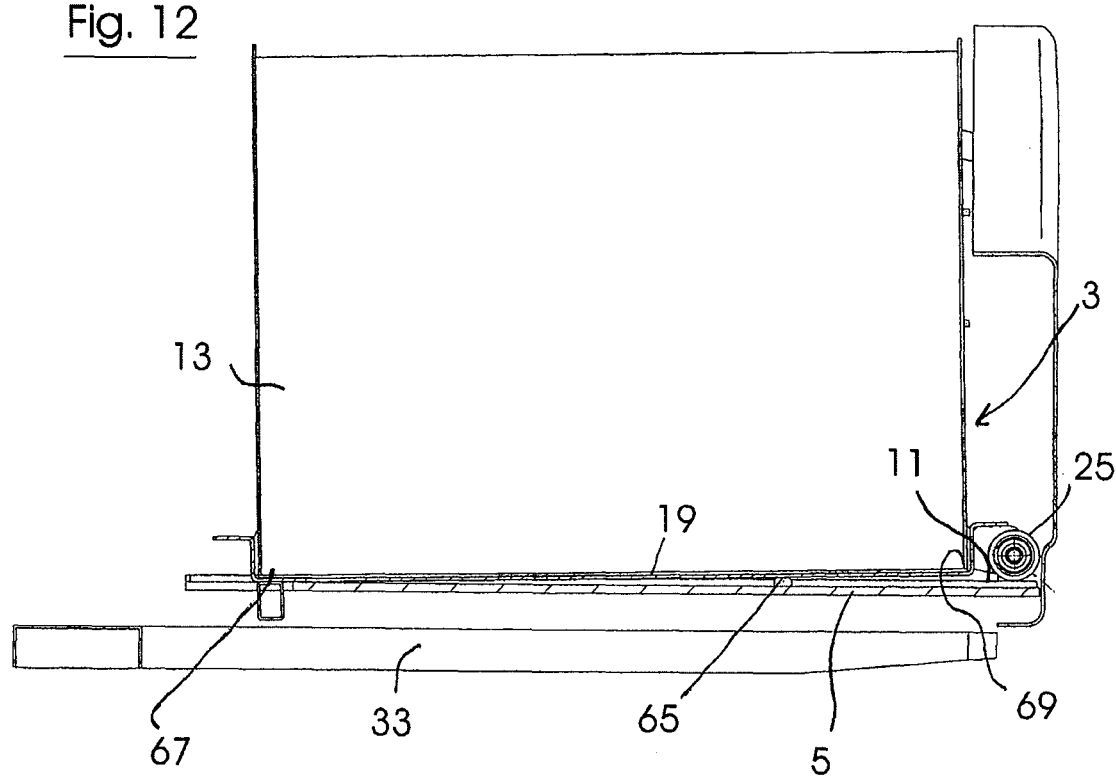
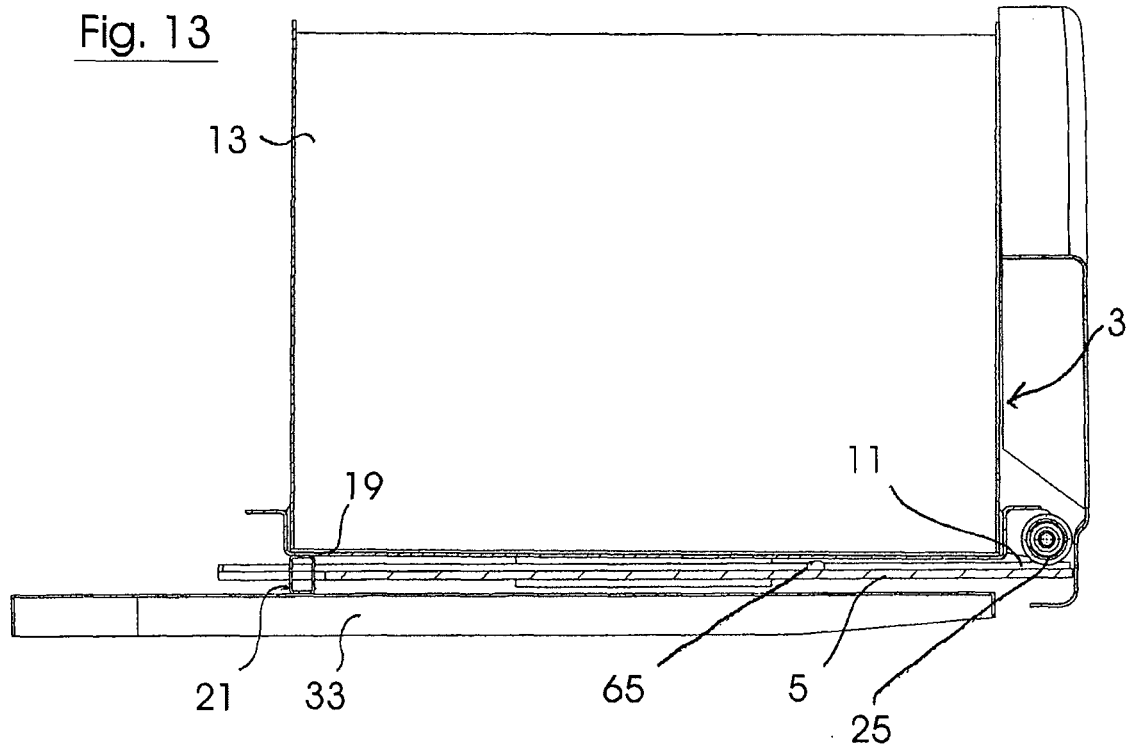

INDUSTRIAL TRUCK WITH EXCHANGEABLE BATTERY BLOCK

The invention relates to an industrial truck, in particular a fork lift, having an exchangeable battery block and a battery case that accommodates said exchangeable battery block, with the battery case having at least one lateral access opening to slide the battery block into the battery case with its first end first, and pull the battery block out of the battery case with its first end last, with the battery block accommodated in the battery case being supported at the bottom of the battery case near its first end with at least one roller or sliding member.

There are various known variations of such industrial trucks, which are driven by electric motors and powered with energy from a battery block, which have a laterally accessible battery case to exchange the battery.

Because a battery block of the type discussed here has a relatively high weight and large volume, transport aids are required to exchange the battery block. For economical reasons, these transport means should be standard transport means, such as manual pallet trucks or fork lifts, which can transport the battery block on fork prongs. This leads to the problem that here is not sufficient room at the underside of the battery block in the battery case to insert the fork prongs of a transport device and pick up the battery block on the fork prongs. In known solutions, the battery case bottom has a deep recess from the lateral access opening, which essentially leaves only narrow bottom side strips on which the battery block rests. This battery block can then be accessed in a simple manner from below with the fork prongs of a pallet truck, which are slid under the industrial truck in the orientation of said recess, and then lifted by means of the fork prongs, and removed from the battery case by pulling back the pallet truck. Likewise, in a reverse cycle of motions, a pallet truck can be used to slide a battery block into the battery case with open battery case bottom. However, the relatively large recess in the bottom of the battery case also extremely weakens the structural strength of the vehicle, which is indicated by a distortion of the frame in the exchange of the battery block and cannot be compensated with simple means.

The object to be attained with the invention is to provide an industrial truck of the type described above which allows an exchange of the battery block in a simple manner with a standard battery transport device, such as a manual pallet truck or the like, for example, and nevertheless features an optimally dimensioned battery case with a stable battery case frame.

To attain the object of the invention, it is proposed to equip an industrial truck of the type described above in such a way that a battery block accommodated in the battery case is provided which has on its first end opposite the second end a projection, which projects above a front edge section of the battery case bottom near the access opening and over the underside of the battery case bottom downward, as lifting abutment for a battery transport device, in particular a pallet truck, to exchange the battery block.

The solution in accordance with the invention allows the following method of operation when exchanging the battery block: A manual pallet truck is slid with its fork prongs under the industrial truck so that the fork prongs reach under the downward projecting lifting abutment of the battery block and can lift said battery block at its second end far enough so that it rests only with the roller on the battery case bottom. Pulling back the pallet truck then causes the battery block to roll out of the battery case until the fork prongs can completely take up the battery block. Then the battery block can be removed from the industrial truck with the pallet truck.

Placing the battery block into the battery case of the industrial truck is accomplished with a reverse cycle of motions of the pallet truck. Instead of a pallet truck, it is also possible, for example to use a forklift vehicle as battery transport device. Instead of one or a plurality of rollers, one or a plurality of sliding members could be provided in a less preferred embodiment of the invention.

According to a further development of the invention, a push frame or carriage featuring the roller and the lifting abutment is provided, which carries the battery block and can be removed from the battery case together with the battery block, or slid into the battery case together with the battery block. This has the advantage that standard battery blocks can be used and left "as is," because the adaptation measures, i.e. providing a lifting abutment and the roller, were made at the push frame. It is possible to permanently assign a push frame to one and the same battery block. However, it is also conceivable that the battery block can be removed from the push frame outside of the battery case, as needed, and the push frame can be used for another newly loaded battery block and slid with the latter into the battery case of the industrial truck.

In accordance with another embodiment of the invention, the roller and the lifting abutment are arranged directly at the battery block housing.

Preferably, the lifting abutment is a slat that runs below the battery block in transverse direction to the direction of insertion when the battery block is slid into the battery case. This geometry of the lifting abutment simplifies access to the lifting abutment from below by means of the fork prongs of the battery transport device without complicated operations to align the battery transport device relative to the battery case.

According to a further development of the invention, the battery case bottom has a relatively small recess near the access opening, which features the front edge section of the battery case bottom, and thus the projection that forms the lifting abutment for the battery transport device projects through the recess downward over the underside of the battery case bottom when the battery block is in the battery case. Essentially, such a recess can be developed as small as corresponding to the dimensions of the lifting abutment so that there is no significant weakening of the frame bottom and its mechanical stability. This type of recess facilitates the complete accommodation of the battery block on the fork prongs from a position where the battery block still rests on the battery case bottom with its roller.

Preferably, at least two rollers are provided as rollers for the battery block on its first end in lateral distance of one another, with the battery case bottom having roller guide tracks running in the direction in which the battery is slid in. In the embodiment with a recess in the bottom of the battery case, as described above, preferably one each guide track runs on both sides of the recess.

Preferably, the guide tracks have raised guide profiles relative to the battery case bottom and the rollers have concave circumferential guide grooves into which the guide profiles of the guide tracks engage when the battery block is slid into the battery case and when the battery block is pulled out of the battery case. This type of guide arrangement essentially represents a self-cleaning system that prevents any accumulation of dirt at the relevant guide places, which could impair the function.

Furthermore, it is proposed that the battery case has lateral guide elements for the battery block. Preferably, said guide elements are rotatably mounted, stationary rollers.

Usefully, the battery case has abutment means which stop the battery block when it is pulled from the battery case before at least one roller leaves the battery case bottom during the rollout, and said abutment means can be overcome by further lifting the battery block and pulling it out of the battery case. The abutment means facilitate taking up the battery block on the fork prongs of the battery transport device if the battery block has already largely been pulled out of the battery case. At an appropriate position of the fork prongs relative to the battery case bottom, it is possible, by lifting the fork prongs, for the fork prongs to reach completely under the battery block and lift and pull the battery block out past the abutment means.

The example of an embodiment is explained below with reference to the figures:

FIG. 3 to 8 show, in schematic sectional representation longitudinally through the battery case in the sectional plane indicated at III in FIG. 1, various snap shots while a battery block is being pulled out of the battery case.

Figure 9:
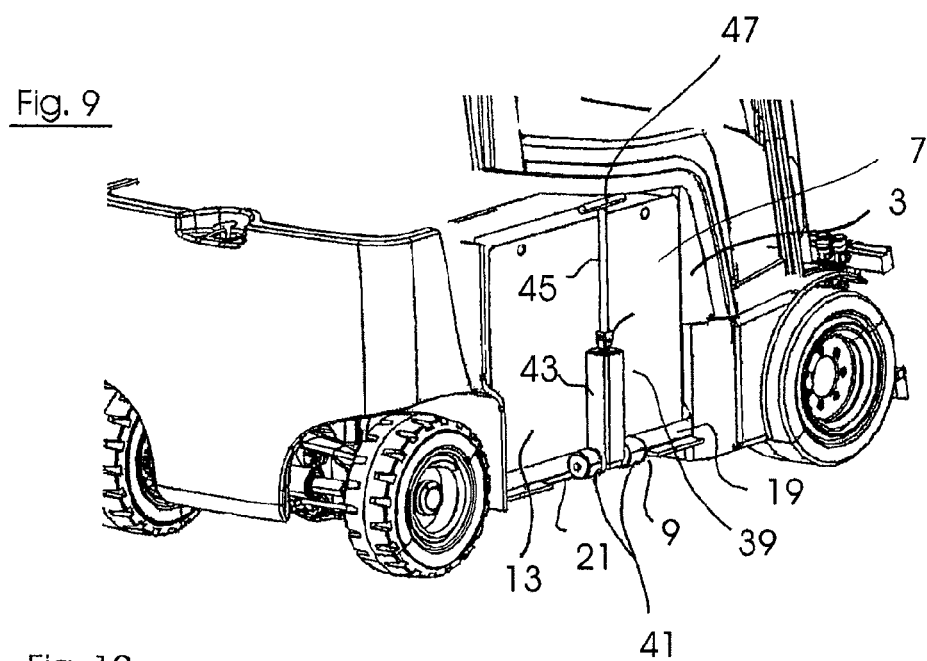
Figure 10:
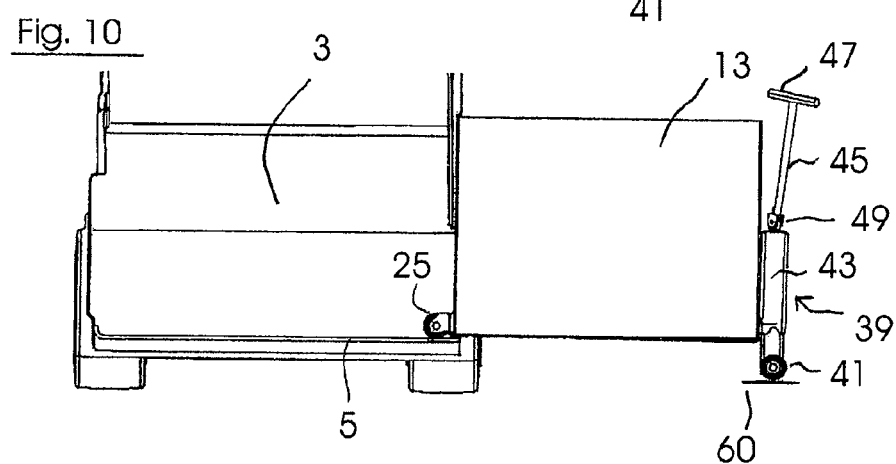
Figure 11:
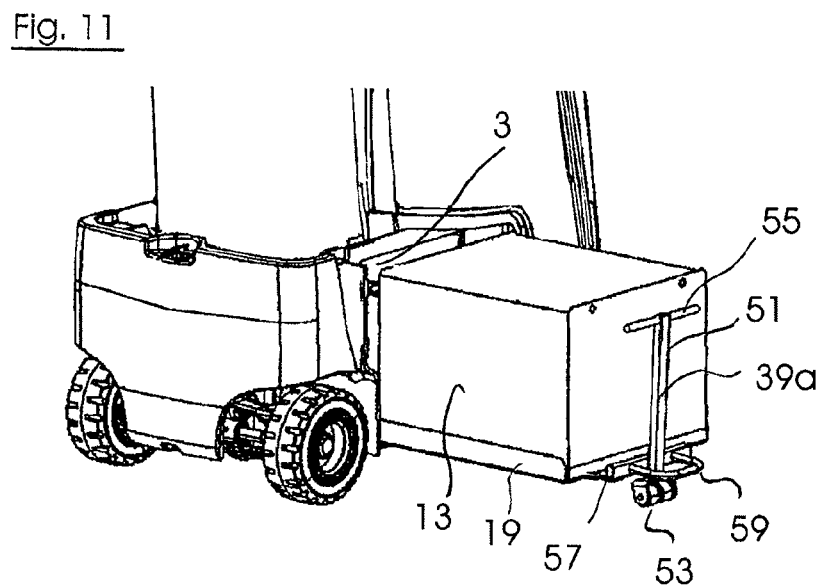

FIG. 9 to 11 show an industrial truck in accordance with the invention with a respective auxiliary device for lifting the battery block 13, pulling the battery block 13 out and sliding the battery block 13 in.

Figure 1:
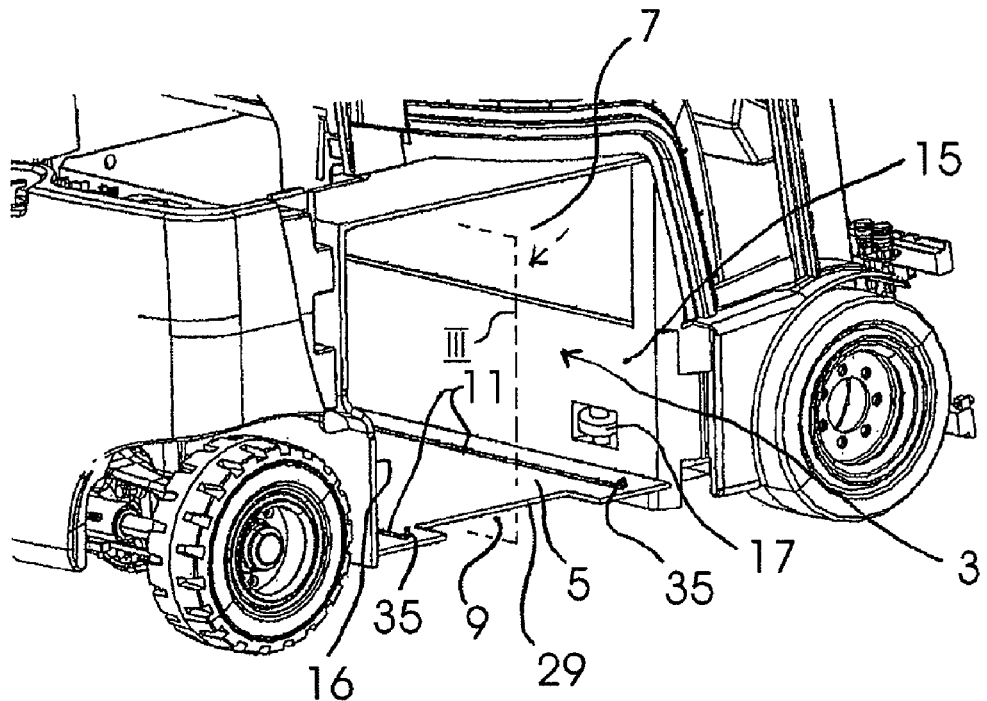
FIG. 1 shows sections of an industrial truck in perspective representation with a view into the empty battery case.

FIG. 12 to 13 show in a schematic sectional view with a section corresponding to the cutting plane indicated at II in FIG. 1, the battery block in resting position (FIG. 12) and/or in lifted position (FIG. 13).

Figure 14:
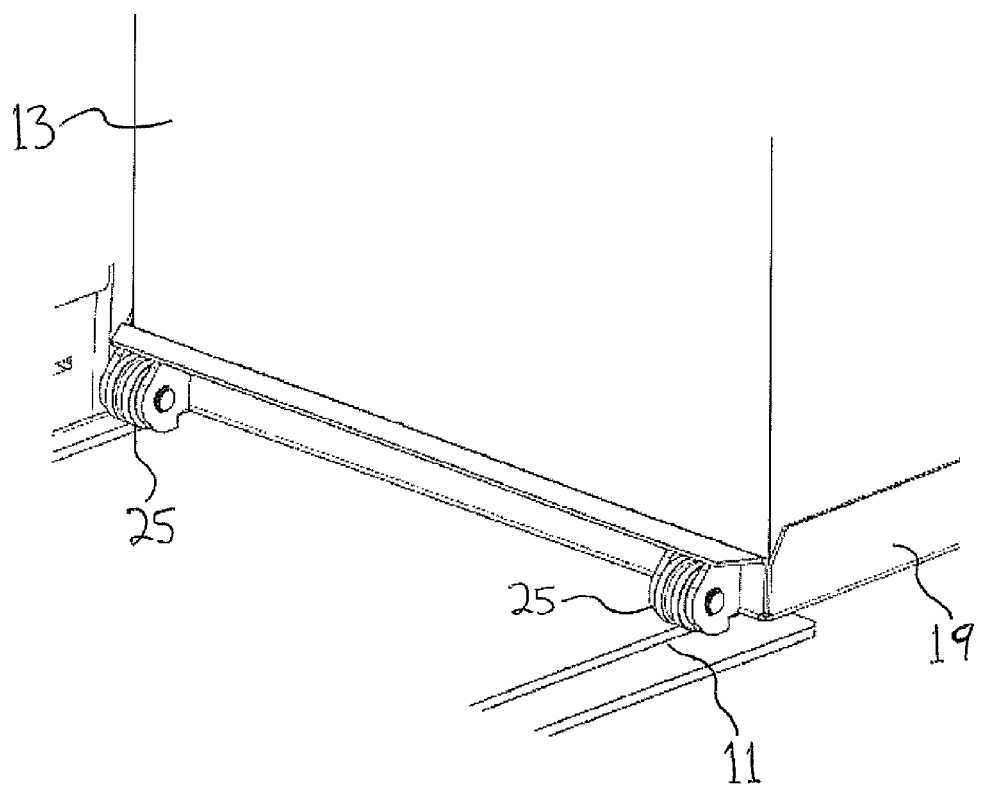

FIG. 14 shows a schematic perspective view of track rollers that run on guide tracks according to one example of an embodiment.

The industrial truck shown only in section in FIG. 1 shows the open battery case 3 which accommodates the battery block. To simplify matters, a closing door and some trim elements that exist in practice are omitted in the figures to simply matters.

FIG. 1 shows the battery case bottom 5 and, starting from the access opening 7, a small recess 9, which dos not noticeably interfere with the structural stability of the frame of the industrial truck. Laterally to the recess 9, the guide tracks 11 run in form of raised guide profiles. On said guide profiles 11, track rollers of a battery block 13, which have a complementary groove profile, run in the tracks if the battery block 13 is slid into the battery case 3 and pulled out of said battery case.

At the side walls 15, 16 of the battery case, lateral guide elements 17 are provided in the form of stationary, rotatably mounted rollers, which also help to slide a battery block 13 into the battery case 3 and/or pull it out of said battery case without jamming or friction.

Figure 2:
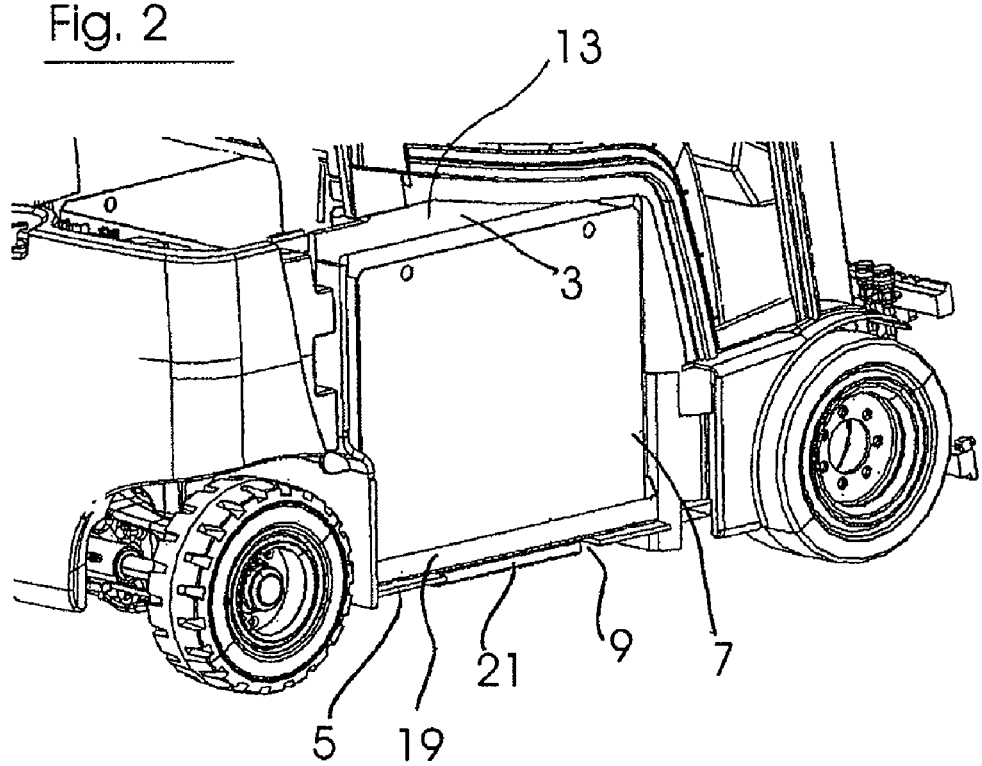
FIG. 2 shows the industrial truck in FIG. 1 in a similar representation with a battery block in the battery case.

According to FIG. 2, the battery case 3 accommodates a battery block 13. The battery block 13 rests on a push frame 19, which has on its end adjacent to the access opening 7 of the battery case 3 a slat 21 which projects through the recess 9 downward over the lower edge of the battery case bottom 5. At the far end of the push frame 19 relative to the slat 21, said push frame has two track rollers (not shown in FIGS. 1 and 2), which are guided at the guide tracks 11.

FIG. 3 shows in a sectional view at the cutting plane indicated at III in FIG. 1 the position of the battery block 13 in the battery case 3. The push frame 19, which is developed similar to a carriage, has on its first end 23, which is inserted far into the battery case 3, the two track rollers 25. In the example, the track rollers 25 are still positioned behind the edge 27 of the battery block 13. However, they are on the guide tracks (not shown in FIG. 3 to 8) of the battery case bottom 5. FIG. 3 also shows quite clearly that the push frame 19 and its lifting abutment slat 21 project downward over the front edge section 29 of the battery case bottom 5 near the access opening 7 in the area of the recess 9, over the underside 31 of the battery case bottom 5. Directly next to the lifting abutment slat, the push frame 19 rests on the battery case bottom 5.

Figure 5:
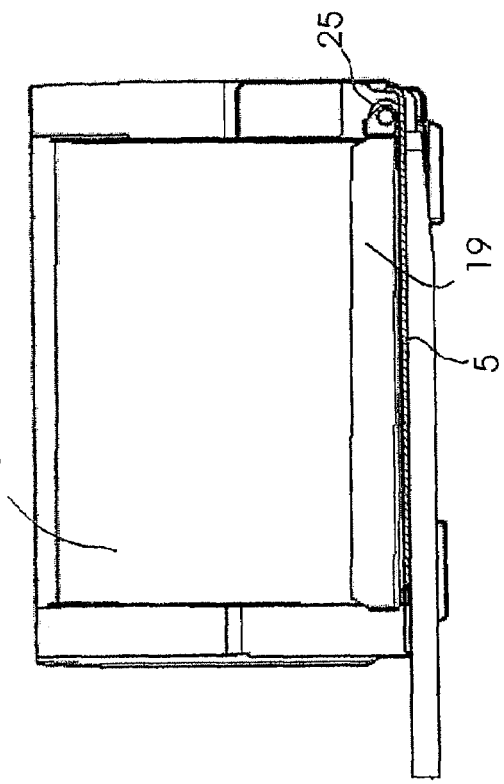
Figure 6:
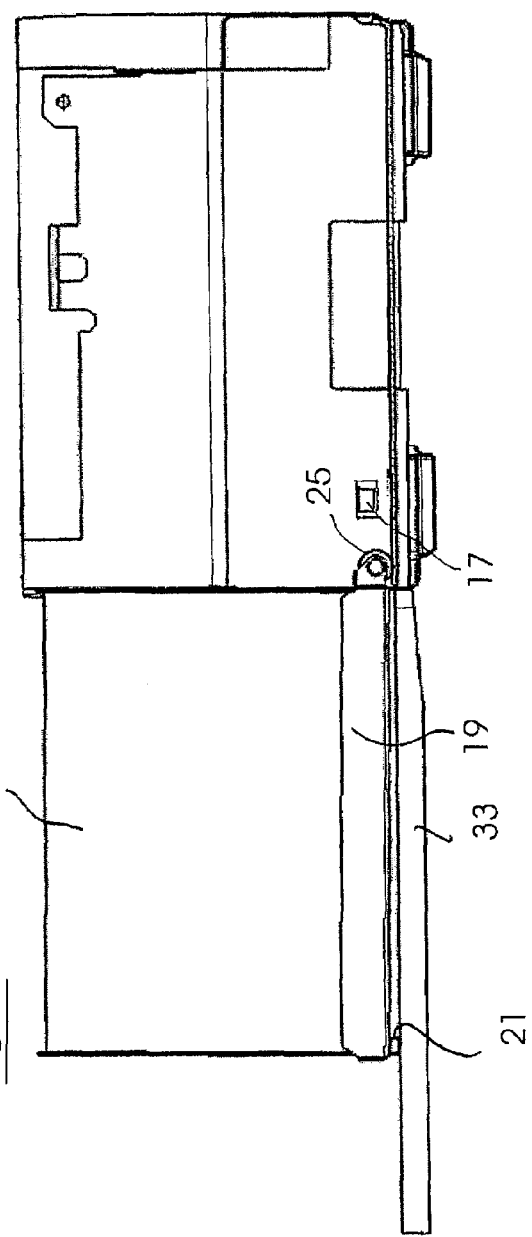

In FIG. 4, the battery block 13 still rests in the same position in the battery case 3, as is also shown in FIG. 3. However, in FIG. 4, the fork prongs 33 of a manual pallet truck have been placed under the battery case bottom 5 such that they can act upon the lifting abutment slat 21 from below. FIG. 5 shows a snapshot where the fork prongs 33 have been lifted far enough so that the lifting abutment slat 21 and thus the push frame 19 and the battery block 13 are also lifted far enough so that the push frame 19 is supported at the battery case bottom 5 only with its rollers 25. If the fork prongs 33 are then pulled back, as is shown in FIG. 6, they carry along the push frame 19 and the battery block 13 resting thereon, to the outside. In the situation according to FIG. 6, the battery case bottom 5 no longer represents an interfering contour for the lifting of the fork prongs 33, although the rollers 25 still rest on the battery case bottom 5. Thus, the fork prongs 33 can be lifted to take up the push frame 19 and the battery block 13 resting thereon completely on the fork prongs 33. This can even occur already if the front ends of the fork prongs 33 are still in the recess 9. Abutment means indicated at 35 in FIG. 1 may be provided to prevent the rollers 25 from disengaging from the battery case floor 5 before the fork prongs 33 are lifted in the situation shown in FIG. 6.

FIG. 7 shows a snapshot where the push frame 19 and the battery block 13 resting thereon have been taken up completely on the fork prongs 33. FIG. 8 shows the battery block and its push frame 19 already removed from the battery case 3.

From the situation according to FIG. 8, in a reverse cycle of motions of the fork prongs 33, the battery block 13 and its push frame 19 can be reinserted into the battery case 3 to recreate the situation according to FIG. 3.

With reference to FIGS. 12 and 13, a possible measure to relief the rollers 25 is pointed out below. This refers to a tilt slat 65, which runs in longitudinal direction of the vehicle in the rear part of the battery case 3 between the guide tracks 11. The tilt slat 65 can be affixed at the battery case bottom and project upward from said battery case bottom. Alternately, however, it can also be provided at the underside of the push frame 19 (or, in embodiments without push frame, at the underside of the battery block) and project downward from the same.

In any case, when the battery block 13 is in the battery case 3, the slat is between the battery case bottom 5 and the battery block 13 and/or its push frame 19 in the rear part of the battery case so that, in FIG. 12, the battery block 13 and its second end at 67 tilt downward toward the battery case bottom 5 due to gravity if the battery block is placed completely on the battery case bottom 5. The opposite first end 69 of the battery block 13 is tilted upward around a tilt axis defined by the tilt slat 65 so that the rollers 25 disengage from the battery case bottom 5 and the guide track 11 and are thus relieved because they no longer have to support the weight of the battery block at the battery case bottom 5. When the battery block 13 rests in the battery case 3, as shown in FIG. 12, the push frame 19 of the battery block 13 therefore rests near the second end 67 directly on the battery case bottom 5—and furthermore on the tilt slat 65.

In the situation shown in FIG. 13, the fork prongs 33 of a pallet truck reach below the lifting abutment slat 21 of the push frame 19 so that the battery block 13 is tilted clockwise around the tilt slat 65 in FIG. 13. Again, the rollers 25 support the battery block 13 at the battery case bottom 5 so that the battery block 13 can be pulled out of the battery case by moving back the fork prongs 33, which support the lifting abutment slat 21, with the rollers 25 running and rolling in their guide tracks 11.

In some embodiments, as illustrated in FIG. 14, the track rollers 25 have circumferential concave guide grooves into which the guide profiles of the guide tracks 11 engage when the battery block 13 is slid into the battery case 3 and when the battery block 13 is pulled out of the battery case 3.

FIG. 9 shows, in a view similar to that in the perspective representation in FIG. 2, the lower part of an industrial truck and its battery block 13 in the battery case 3. What is special with respect to the variant in accordance with the invention according to FIG. 9 is a compact auxiliary device 39 to lift and pull out or slide in the battery block 13. The auxiliary device 39 is preferably detachably attached at the end of the push frame 19 adjacent to the access opening 7 and has track rollers and/or track wheels 41, a crank mechanism 43 to lower and/or lift the track rollers 41 and a crank 45 to operate the mechanism 43. FIG. 9 shows the auxiliary device 39 in passive condition with lifted track rollers 41.

FIG. 10, in a sectional representation through the battery case 3, shows the auxiliary device 39 in active condition, i.e., with lowered support wheels 41. From the situation according to FIG. 9, the support wheels 41 are lowered by operating the crank 45 until the support wheels 41 come into contact with the floor, with a further operation of the crank 45 then lifting the push frame 19 and its battery block at the end adjacent to the access opening 7 far enough so that it can be driven out of the battery case 3 into the position shown in FIG. 10 by pulling at the crank handle 47. In the position according to FIG. 10, the battery block 13 can be removed upward with the help of a crane, for example, and then exchanged. The position according to FIG. 10 furthermore allows simplified access to the battery block 13 for maintenance purposes.

From the position according to FIG. 10, where the battery block 13 is supported at the battery case bottom 5 with its rollers 25 and at the bottom 60 with the supporting wheels 41, it can be rolled back into the battery case 3 by simply sliding it back, and then the supporting wheels 41 can be retracted by operating the crank 45 to place the battery block 13 on the battery case bottom 5 at its end adjacent to the access opening 7. This recreates the situation shown in FIG. 9. The crank handle 45 is articulated at the upper end of the crank mechanism (spindle drive) 43 to 49 so that it can be transversely oriented, if necessary.

In the embodiment in accordance with FIGS. 9 and 10, another optional variant is to retract or extend the supporting wheels hydraulically or with an electrical motor. It is also conceivable to draw the battery block in and out automatically with appropriate hydraulic or electromotor means.

FIG. 11, in a perspective similar to that in FIG. 9, shows an industrial truck in accordance with the invention with a battery block 13 pulled out of the battery case 3. In the variant in FIG. 11, an auxiliary device 39a provided for lifting the battery block 13 and pulling it in and out, has a rigid rodding 51 with bottom supporting wheels 53 on its lower end and a handle 55 on its upper end. From the rodding 51, a lever projects in an angular fashion for engaging the push frame 19 toward the battery block. By tilting the auxiliary device 39a around its bottom supporting wheels 53, the battery block 13 can be lifted or lowered at its second end, as needed. In lifted condition, the battery block rests with the rollers 25 of its push frame 19 on the battery case bottom 5—and with the bottom track rollers 53 of the auxiliary device 39a on the bottom 60—and can be rolled in and/or out of the battery case by pulling and/or pushing the handle 55. To lift and/or lower the battery block, the auxiliary device 39a is operated similar to a trolley. According to FIG. 11, the auxiliary device 39a has, slightly above the bottom track rollers 53, a bar 59 that projects backward. Said bar can be used by an operator to better control the lift- or lower motion of the battery block 13 pub placing his foot on the bar. The bar 59 furthermore can be used to set up the auxiliary device 39a in a tilted perpendicular position if it is removed from the battery block 13.

The auxiliary devices 39 and 39a in FIG. 9 to 11 are very compact and can be transported as on board devices at the industrial truck.

The invention claimed is:

1. An industrial truck comprising:
   (1) an exchangeable battery block including:
      (a) a first end, and
      (b) a second end opposite the first end; and
   (2) a battery case capable of accommodating the battery block, the battery case including:
      (a) at least one lateral access opening configured to permit sliding of the battery block with the first end first into the battery case and pulling the battery block with the first end last out of the battery case, and
      (b) a battery case bottom having (i) a front edge section near the lateral access opening and (ii) an underside;
   (3) at least one independent roller or sliding member that, when the battery block is accommodated in the battery case, supports the battery block on the battery case bottom near the first end of the battery block;
   (4) a projection that, when the battery block is accommodated in the battery case, (a) projects (i) over the front edge section of the battery case bottom and (ii) over the underside of the battery case bottom downward and (b) is configured to be used as a lifting abutment for a battery transport device to lift the battery block and pull said battery block out of the battery case; and
   (5) a push frame that (a) carries the battery block, (b) is configured to be removed together with the battery block from the battery case or slid into the battery case together with the battery block and (c) includes (i) the at least one independent roller or sliding member and (ii) the projection.

2. The industrial truck of claim 1, wherein the at least one independent roller or sliding member includes at least two rollers for the battery block on the first end of the battery block with lateral distance relative to one another, and the battery case bottom has guide tracks for the rollers which run in a direction in which the battery block is inserted into the battery case.

3. The industrial truck of claim 2, wherein the guide tracks have guide profiles that are raised relative to the battery case bottom, and the rollers have circumferential concave guide grooves into which the guide profiles of the guide tracks engage when the battery block is slid into the battery case and when the battery block is pulled out of the battery case.

4. The industrial truck of claim 1, wherein the battery case has lateral guide elements for the battery block.

5. The industrial truck of claim 4, wherein the lateral guide elements comprise stationary rotatably mounted rollers.

6. The industrial truck of claim 1, wherein the battery block is capable of being removed from the push frame outside of the battery case.

7. The industrial truck of claim 1, wherein (i) the at least one independent roller or sliding member and (ii) the projection are arranged directly at a housing of the battery block.

8. The industrial truck of claim 1, wherein the projection is a slat that runs below the battery block and extends transversally to a direction in which the battery block slides when the battery block is being inserted into the battery case.

9. The industrial truck of claim 1, wherein the battery case has abutment means which stop the battery block when the battery block is pulled out of the battery case before the at least one independent roller or sliding member leaves the battery case bottom when rolling out, and the abutment means is capable of being overcome by further lifting and pulling the battery block out of the battery case.

10. The industrial truck of claim 1, further comprising an on-board mobile auxiliary device configured to lift the battery block in the battery case, pull the battery block out of the battery case and slide the battery block into the battery case.

11. The industrial truck of claim 1, wherein the industrial truck is a fork lift.

12. The industrial truck of claim 1, wherein the battery transport device is a fork lift device.

13. An industrial truck comprising:
   (1) an exchangeable battery block including:
      (a) a first end, and
      (b) a second end opposite the first end; and
   (2) a battery case capable of accommodating the battery block, the battery case including:
      (a) at least one lateral access opening configured to permit sliding of the battery block with the first end first into the battery case and pulling the battery block with the first end last out of the battery case, and
      (b) a battery case bottom having (i) a front edge section near the lateral access opening and (ii) an underside;
   (3) at least one independent roller or sliding member that, when the battery block is accommodated in the battery case, supports the battery block on the battery case bottom near the first end of the battery block; and
   (4) a projection that, when the battery block is accommodated in the battery case, (a) projects (i) over the front edge section of the battery case bottom and (ii) over the underside of the battery case bottom downward and (b) is configured to be used as a lifting abutment for a battery transport device to lift the battery block and pull said battery block out of the battery case;
   wherein, near the access opening, the battery case bottom has a recess including the front edge section of the battery case bottom so that the projection that forms the lifting abutment for the battery transport device projects through the recess downward past the underside of the battery case bottom when the battery block is in the battery case.

* * * * *